US010058027B2

(12) United States Patent
Gessel et al.

(10) Patent No.: US 10,058,027 B2
(45) Date of Patent: Aug. 28, 2018

(54) AGRICULTURAL HARVESTER ROW UNIT

(71) Applicant: CNH Industrial America LLC, New Holland, PA (US)

(72) Inventors: James M. Gessel, Geneseo, IL (US); Joel T. Cook, Lititz, PA (US); Eric L. Walker, Narvon, PA (US); Michael L. Berggren, Davenport, IA (US); Brian P. Crow, Rock Island, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/248,249

(22) Filed: Aug. 26, 2016

(65) Prior Publication Data
US 2018/0054960 A1    Mar. 1, 2018

(51) Int. Cl.
| A01D 45/02 | (2006.01) |
| A01D 34/01 | (2006.01) |
| A01D 101/00 | (2006.01) |
| A01F 7/06 | (2006.01) |

(52) U.S. Cl.
CPC ......... *A01D 34/015* (2013.01); *A01D 45/021* (2013.01); *A01D 2101/00* (2013.01); *A01F 7/06* (2013.01)

(58) Field of Classification Search
CPC ...... A01D 45/028; A01D 41/12; A01D 57/22; A01D 82/02; A01D 45/021; A01D 45/025; A01D 45/02; A01D 34/015; A01D 2101/00; A01F 29/14; A01F 7/06
USPC ... 56/52, 60, 500–504, 13.5, 13.6, 698, 106, 56/111
See application file for complete search history.

(56) References Cited

U.S. PATENT DOCUMENTS

| 5,063,728 A | 11/1991 | Garter et al. |
| 6,226,969 B1 | 5/2001 | Becker |
| 6,412,259 B1 * | 7/2002 | Wiegert ............... A01D 45/025 56/60 |
| 7,047,717 B1 * | 5/2006 | Wolters ................ A01D 45/021 56/60 |
| 7,874,135 B2 * | 1/2011 | Nagy ................. A01D 34/8355 56/504 |
| 7,913,480 B2 | 3/2011 | Christensen et al. |
| 8,863,487 B2 | 10/2014 | Calmer |
| 2014/0260164 A1 | 9/2014 | Lohrentz et al. |
| 2015/0257337 A1 * | 9/2015 | Schrattenecker .... A01D 45/025 56/60 |

FOREIGN PATENT DOCUMENTS

| DE | 102012014087 A1 | 1/2014 |
| EP | 2404496 A2 | 1/2012 |
| WO | 2008104816 A1 | 9/2008 |

* cited by examiner

*Primary Examiner* — Robert E Pezzuto
(74) *Attorney, Agent, or Firm* — Peter K. Zacharias

(57) ABSTRACT

A row unit system for a corn header of an agricultural harvester, the row unit system including a plurality of row units and a plurality of chopper assemblies. A first row unit and an adjacent second row unit are each coupled to the corn header, with each row unit having a first and second leg. The first and second legs are substantially a mirror image of each other. The chopper assemblies are positioned proximate to the legs of the row units and include a chopper assembly nested between the second leg of the first row unit and the first leg of the second row unit.

24 Claims, 15 Drawing Sheets

AGRICULTURAL HARVESTER ROW UNIT

FIELD OF THE INVENTION

The present invention relates to agricultural harvesters, and, more particularly, to row units of a header for agricultural harvesters.

BACKGROUND OF THE INVENTION

An agricultural harvester known as a "combine" is historically termed such because it combines multiple harvesting functions with a single harvesting unit, such as picking, threshing, separating and cleaning. A combine includes a header, which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed, it falls through perforations in the concaves onto a grain pan. From the grain pan, the grain is cleaned using a cleaning system, and is then transported to a grain tank onboard the combine. A cleaning fan blows air through the sieves to discharge leaves, straw, chaff and other debris toward the rear of the combine.

A specialized corn head is ordinarily coupled to the combine used for the harvesting of corn. The corn head is equipped with row units each having snap rolls that strip the stalk and leaf away from the ear, so that only the ear (and husk) enter the throat of the combine. The row units are generally separated by snouts that serve to direct the corn to the row units. Each row unit generally separates the ears of corn from most of the material other than grain (MOG) and conveys the ears of corn and some MOG toward the rear of the header, where it is conveyed laterally inward toward a feeder housing using a double pitch cross auger. The ears of corn and associated MOG are then transported into the combine to undergo the threshing, separating and cleaning steps.

The row units of the prior art harvesters are not modular in nature, and as a result their construct does not allow for the ease of separation of the main frame, the toolbar mounts and the gearbox. The resulting prior art harvesters, as a result of their configuration, have a minimum row separation of 20 inches.

What is needed in the art is a harvester that has modularized row units for ease of maintenance and assembly, and for narrow row widths.

SUMMARY OF THE INVENTION

The present invention provides modular row units that are spaced for narrow rows and to accommodate a nested set of chopper assemblies.

The invention in one form is directed to a row unit system for a corn header of an agricultural harvester, the row unit system including a plurality of row units and a plurality of chopper assemblies. A first row unit and an adjacent second row unit are each coupled to the corn header, with each row unit having a first and second leg. The first and second legs are substantially a mirror image of each other. The chopper assemblies are positioned proximate to the legs of the row units and include a chopper assembly nested between the second leg of the first row unit and the first leg of the second row unit.

The invention in another form is directed to an agricultural vehicle including a chassis, a crop processing mechanism and a header system carried by the chassis. The crop processing mechanism is configured to separate crop material and discharge crop residue therefrom. The header system gathers the crop and includes a tool bar; and a row unit system coupled to the tool bar. The row unit system includes a plurality of row units and a plurality of chopper assemblies. A first row unit and an adjacent second row unit are each coupled to the corn header, with each row unit having a first and second leg. The first and second legs are substantially a mirror image of each other. The chopper assemblies are positioned proximate to the legs of the row units and include a chopper assembly nested between the second leg of the first row unit and the first leg of the second row unit.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
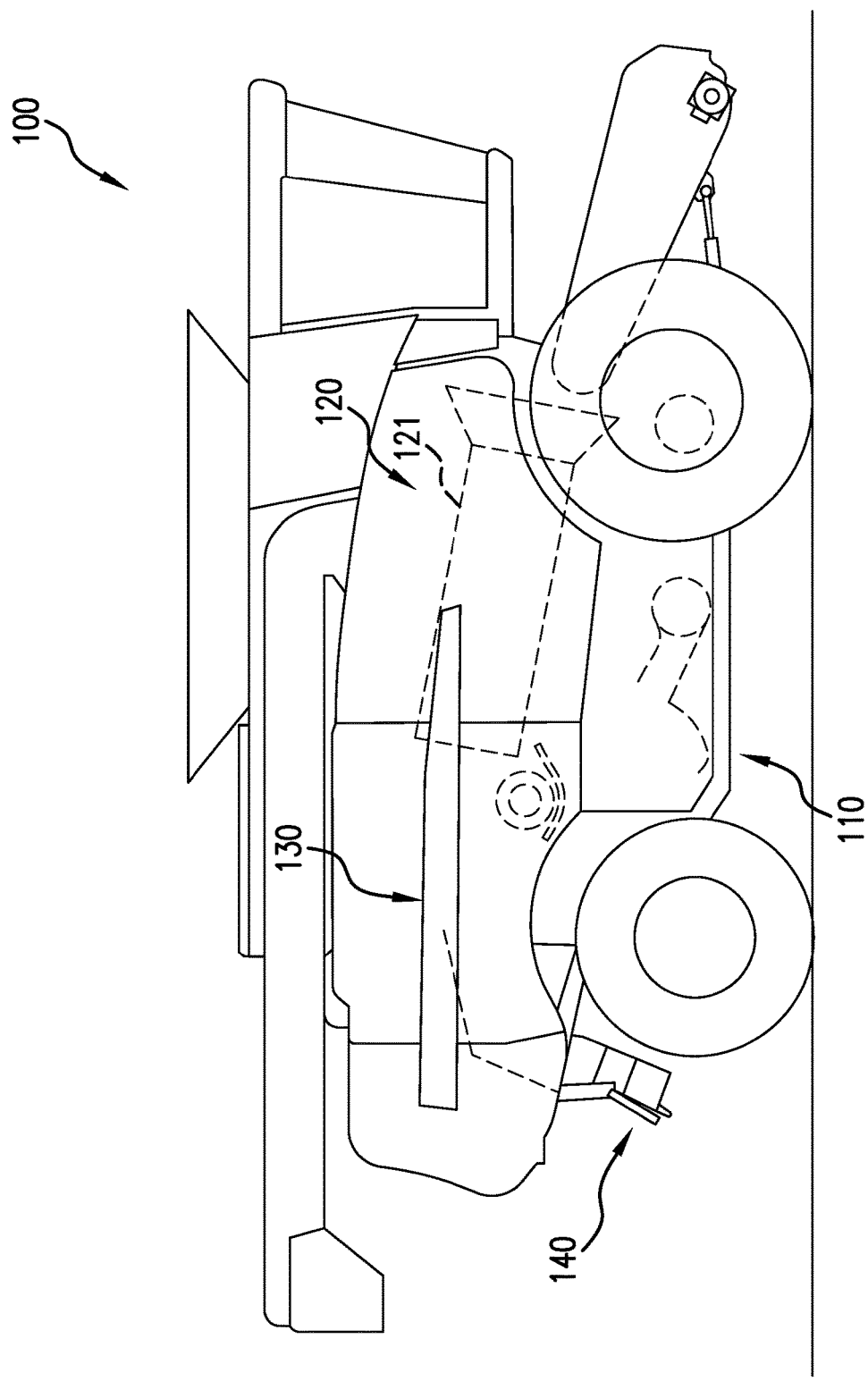
FIG. 1 is a side view of an agricultural harvester that uses an embodiment of a corn header of the present invention.

FIG. 1 shows an agricultural combine 100, which includes a chassis 110 carrying the usual harvesting apparatus (not all of which is shown to facilitate an understanding of the invention). An axially oriented crop processing system 120 receives harvested crop and a crop residue handling system 130 with a crop residue spreading system 140 is positioned at the aft end of combine 100. The crop processing system 120 includes a cylindrical threshing rotor 121 that conveys a flow of crop material in a helical flow path. As the crop material is moved through the processing apparatus 120, the desired crop such as grain or other material is loosened and separated from crop residue such as husk and pods in a cleaning system located beneath the threshing rotor 121.

Figure 2:
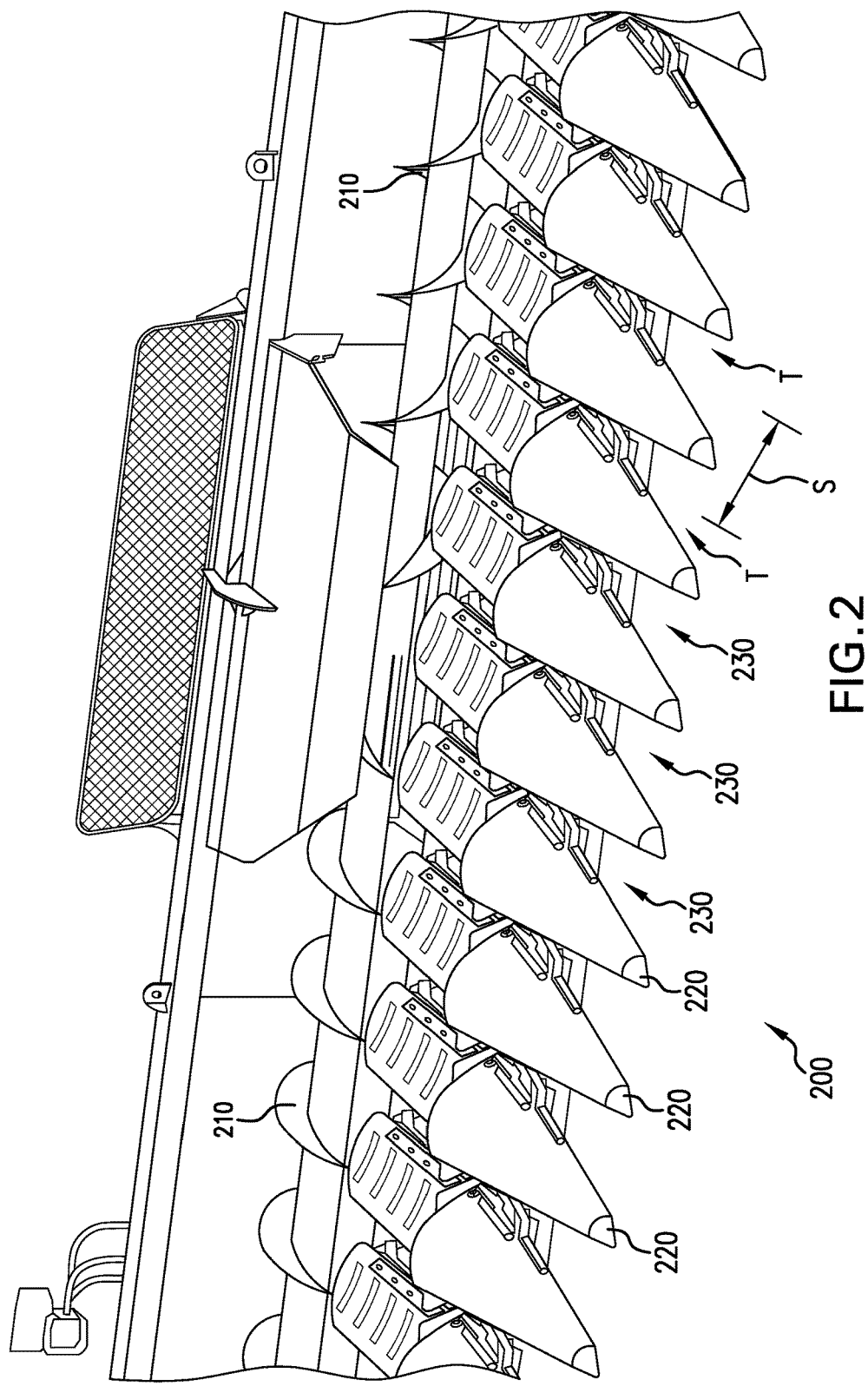
FIG. 2 is a perspective view of an exemplary embodiment of the header attached to the harvester of FIG. 1.

Now, additionally referring to FIG. 2, there is illustrated a corn header 200 that is coupled to the fore end of combine 100 in a well-known manner. Header 200 includes a dual flighted auger 210, a series of snout assemblies 220 that each cover adjacent sides of row units 230. Row spacing S of the crop corresponds to the distance between the throats T of each row unit 230. Although the construct discussed herein can be used on any row spacing, row spacing S of an embodiment of the invention is 20 inches, less than 20 inches or in the exemplary embodiment of the invention spacing S is 15 inches.

Figure 3:
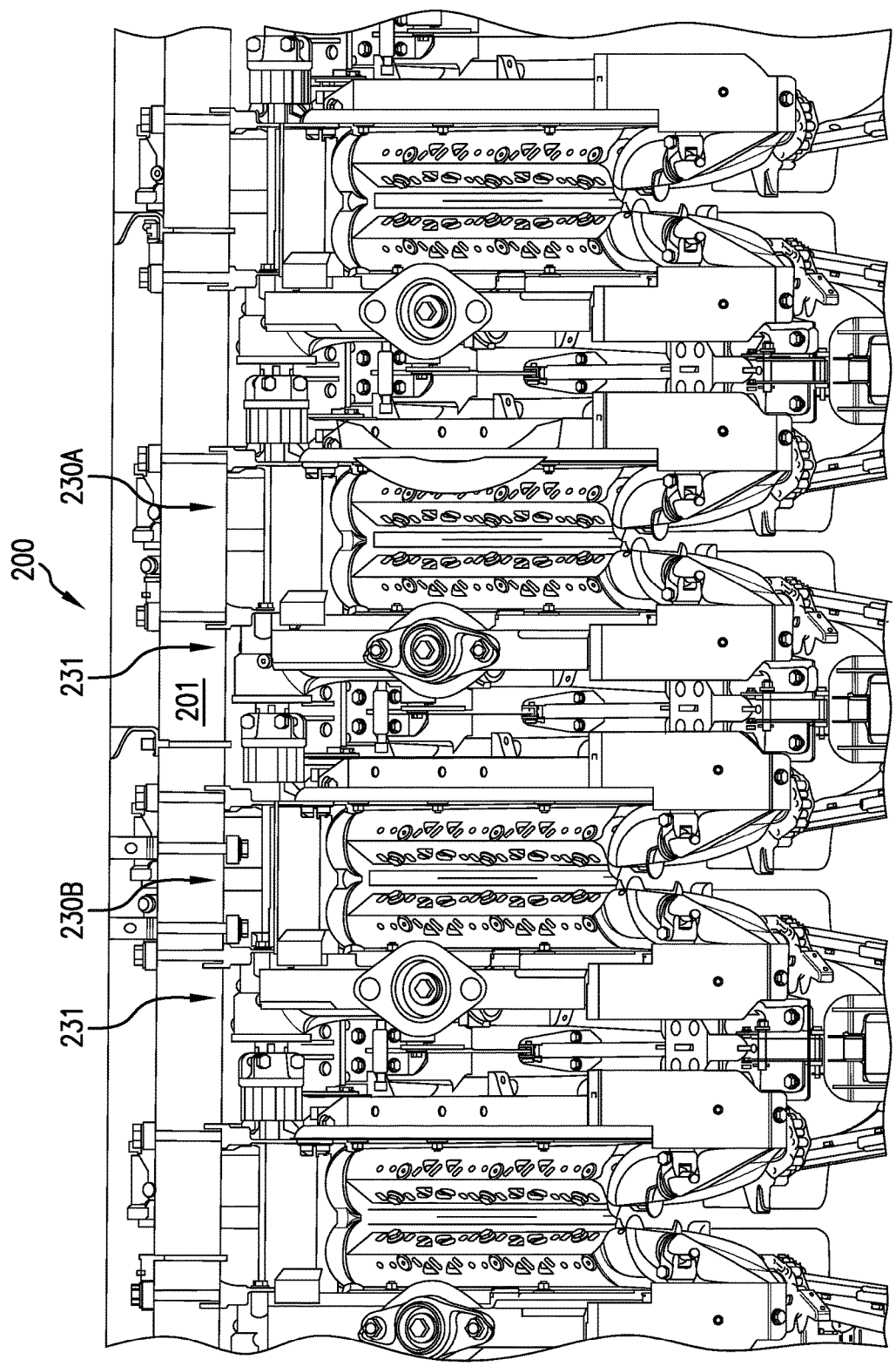
FIG. 3 is a bottom view of the header shown in FIG. 2 showing a bottom view of the row units.

Now, additionally referring to FIG. 3 there is shown a bottom view of header 200 making tool bar 201 visible to which row units 230 are coupled. Here adjacent row units 230A and 230B are shown with a chopper assembly 231 therebetween.

Figure 4:
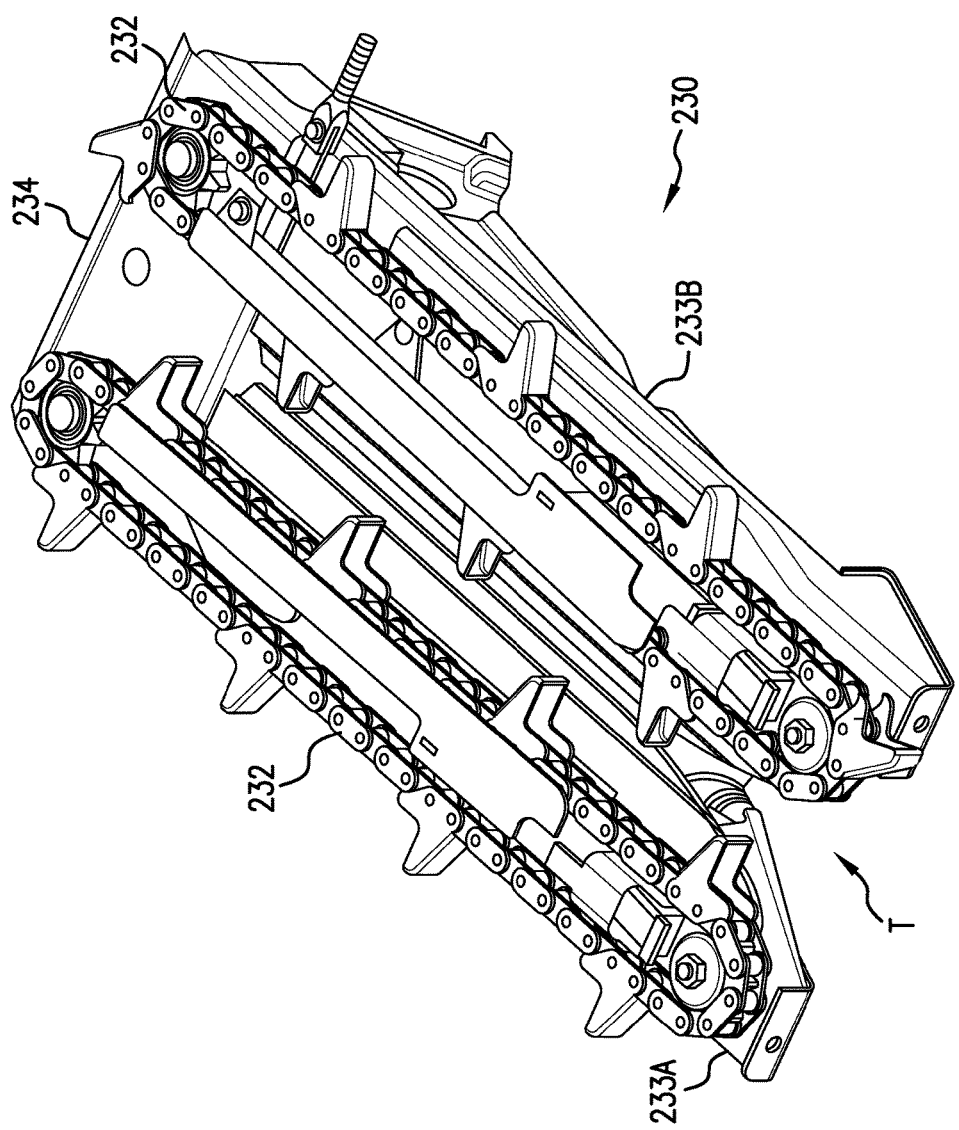
FIG. 4 is a perspective view, from a forward upper point of view, of one row unit with the exterior features omitted for the sake of clarity, the row unit being a part of the header of FIG. 2.

Now additionally referring to FIG. 4 there are shown some additional details of row unit 230, with chains 232 mounted atop legs 233A and 233B. A frame 234 at the top of row unit 230 provides for the coupling of row unit 230 to tool bar 201 and for the attachment thereto of legs 233A and 233B. Legs 233A and 233B are mirror images of each other.

Figure 5:
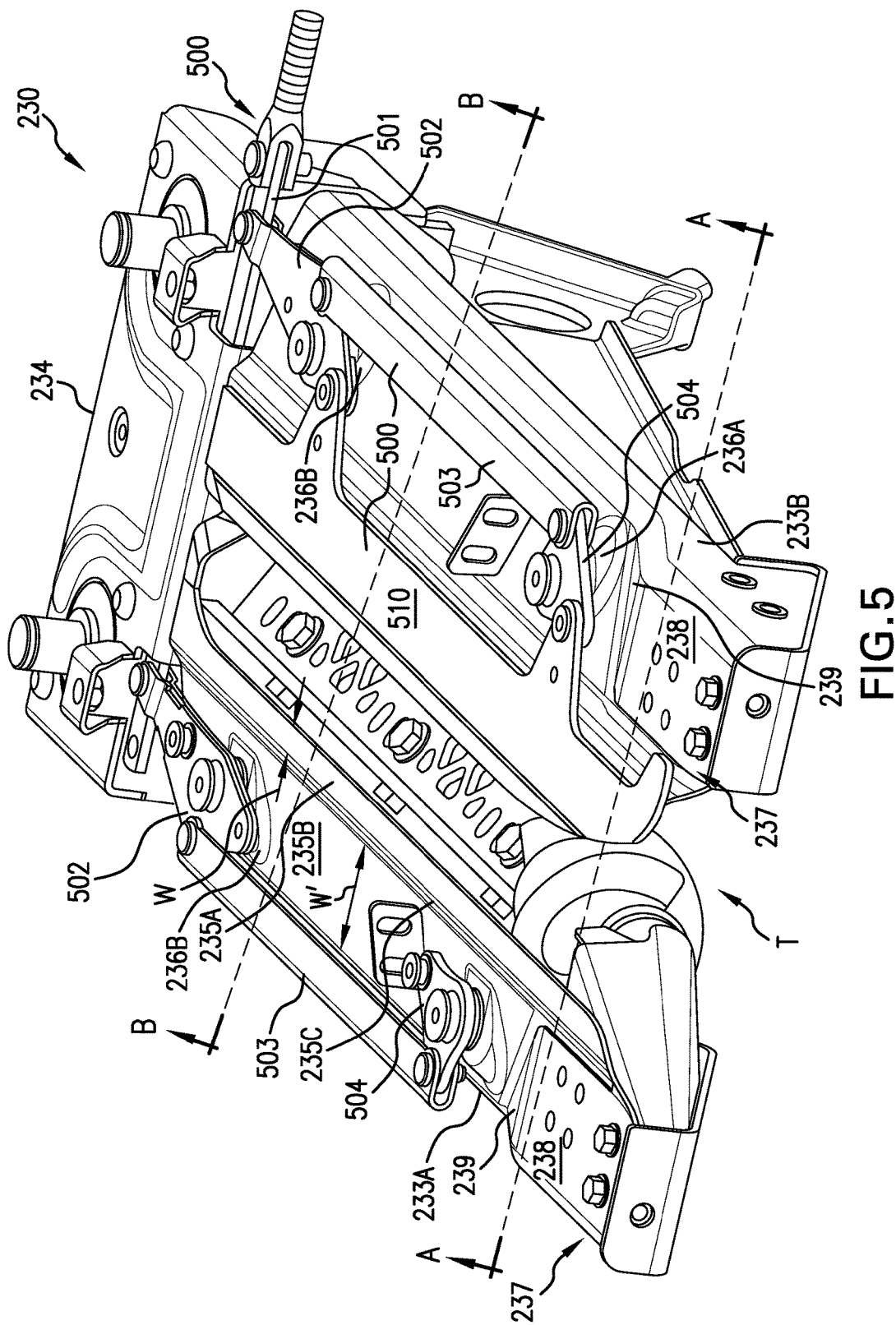
FIG. 5 is another perspective view of the row unit of FIG. 4 with the chains removed.

Yet further in also looking to FIG. 5, there is illustrated part of a deck plate assembly 500 shown in its entirety on leg 233B and in part on leg 233A. A deck plate 510 is adjustably positioned over throat T with another deck plate (not shown in this view) coming in from the opposite side and being a mirror image to the deck plate 510 shown in this view. A bar 501 is slidingly constrained in frame 234 and is coupled to adjacent row units 230 and eventually to an actuator (not shown) for the adjustment of a gap between deck plates 510. Pivot links 502 and 504 along with linkage 503 function to establish a uniform gap between deck plates 510 as deck plates 510 are adjusted.

At the top of leg 233A a flat surface 235A is what a deck plate 510 slides on and is generally parallel to the positioning of the bottom surface of deck plate 510. Flat surface 235A plus optionally transition 235C has a width W as compared to width W' of sloped surface 235B, with W' being wider that W by several times or a multiple of times. W' is 3, 4, 5 or even 10 times as wide as W. As a ratio W:W' can be 1:3, 1:4, 1:5 . . . 1:10 or fractional values therebetween. Sloped surface 235B is generally adjacent to surface 235A and slopes generally downward away from surface 235A by at least 18 degrees and preferably by approximately 20 degrees. These attributes are of course mirrored in leg 233B.

Figure 6:
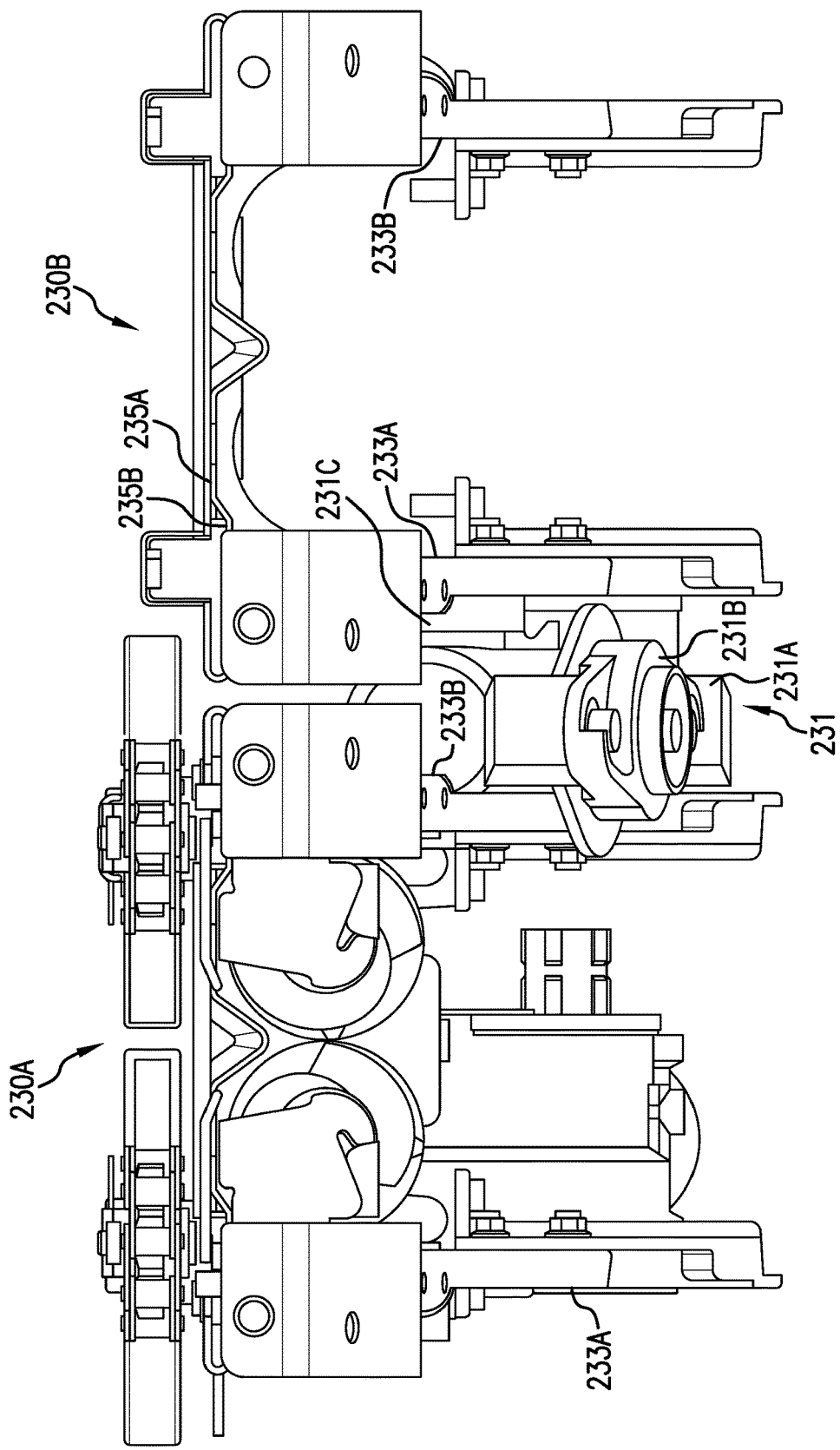
FIG. 6 is an end on view of two row units of the header of FIG. 2 showing the bare frame and legs of the row unit on the right and a row unit with the operational components assembled on the left, with a chopper assembly nested therebetween.

Now, additionally referring to FIG. 6 row units 230A and 230B are shown in a partially sectioned view with the operative components of row unit 230B completely removed and with them shown in row unit 230A. Here chopper assembly 231 is shown nested between leg 233B of row unit 230A and leg 233A of row unit 230B. With portions of these two legs above chopper assembly 231. Chopper assembly 231 includes a blade 231A, a blade mounting flange 231B and a gearbox 231C. Gearbox 231C is positioned between the legs of the adjacent row units 230A and 230B.

Figure 7:
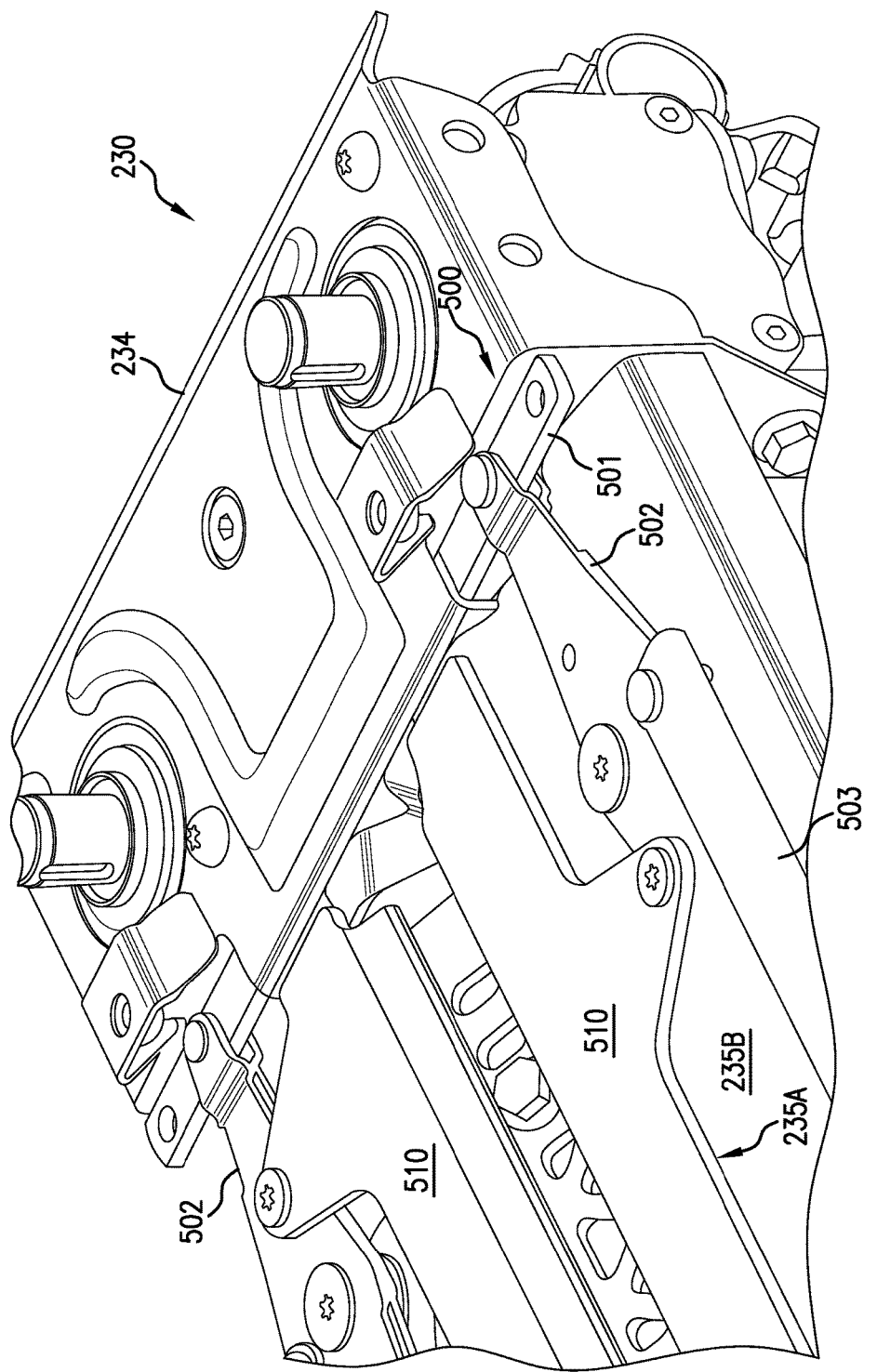
FIG. 7 is a close up perspective view of the row units of FIGS. 3-6.
Figure 8:
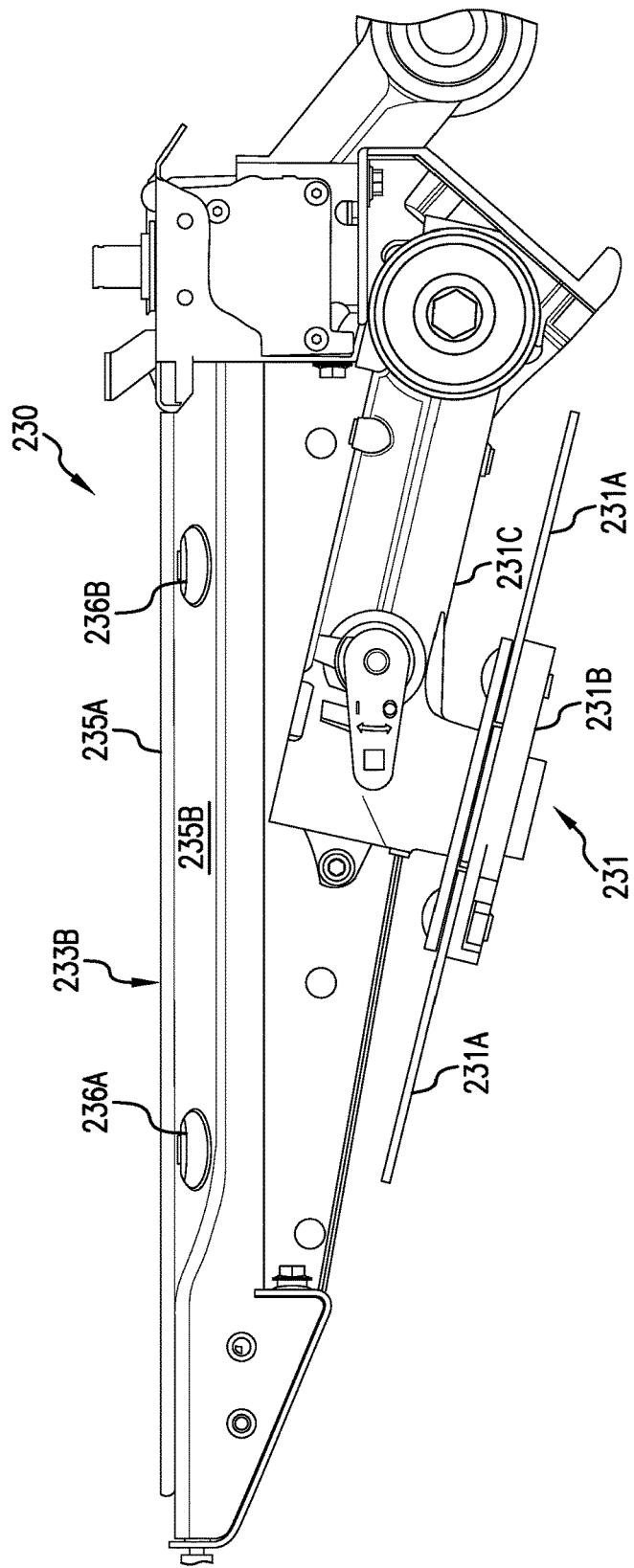
FIG. 8 is a side view looking at part of a row unit of FIGS. 3-7 in the background with the chopper assembly in the foreground.

Further reviewing FIG. 7, closer details of deck plate assembly 500 can be seen with both deck plates 510 being opened up and sloped surface 235B that falls away from the back side of deck plate 510. From another perspective, as shown in FIG. 8, where surface 235A is normal to the plane of the view sloped surface 235B can be more easily seen. The view of FIG. 8 is normal to the direction of travel of combine harvester 100, which would be to the right of the figure. Also in this view is a profile view of chopping assembly 231.

Figure 9:
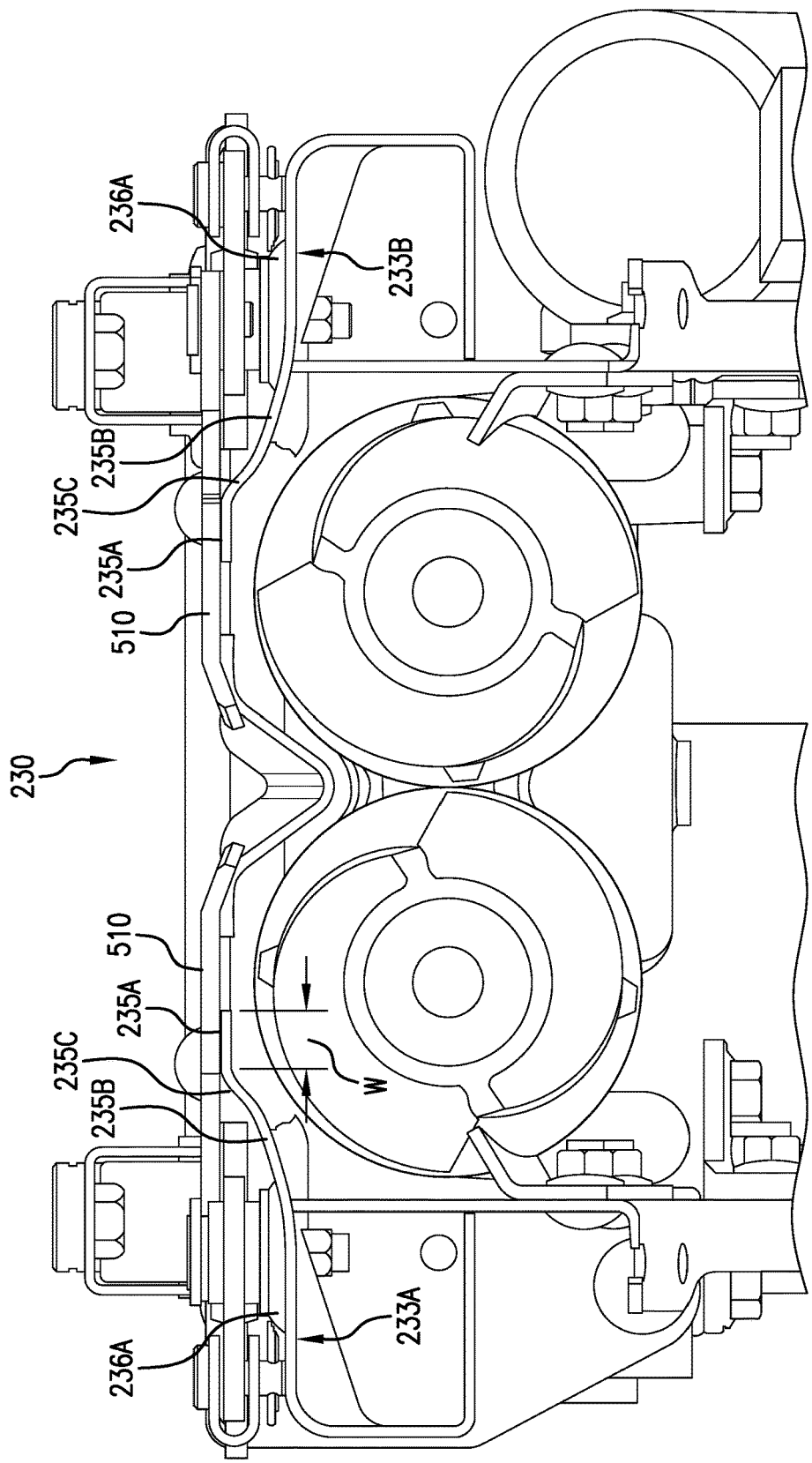
FIG. 9 is a partially sectioned end view from a similar perspective of FIG. 6, showing the deck plates as they contact the legs of the row unit of FIGS. 3-8.

Now, referring to FIG. 9 there is shown a partially sectioned view of row unit 230 taken along a section A-A through the end portions 237 of legs 233A and 233B, and particularly through the flat surfaces 238, of legs 233A and 233B in FIG. 5, in accordance with an exemplary embodiment of the present invention. Here again width W is relatively narrow as compared to the bottom of deck plates 510 or the sloped area 235B.

Figure 10:
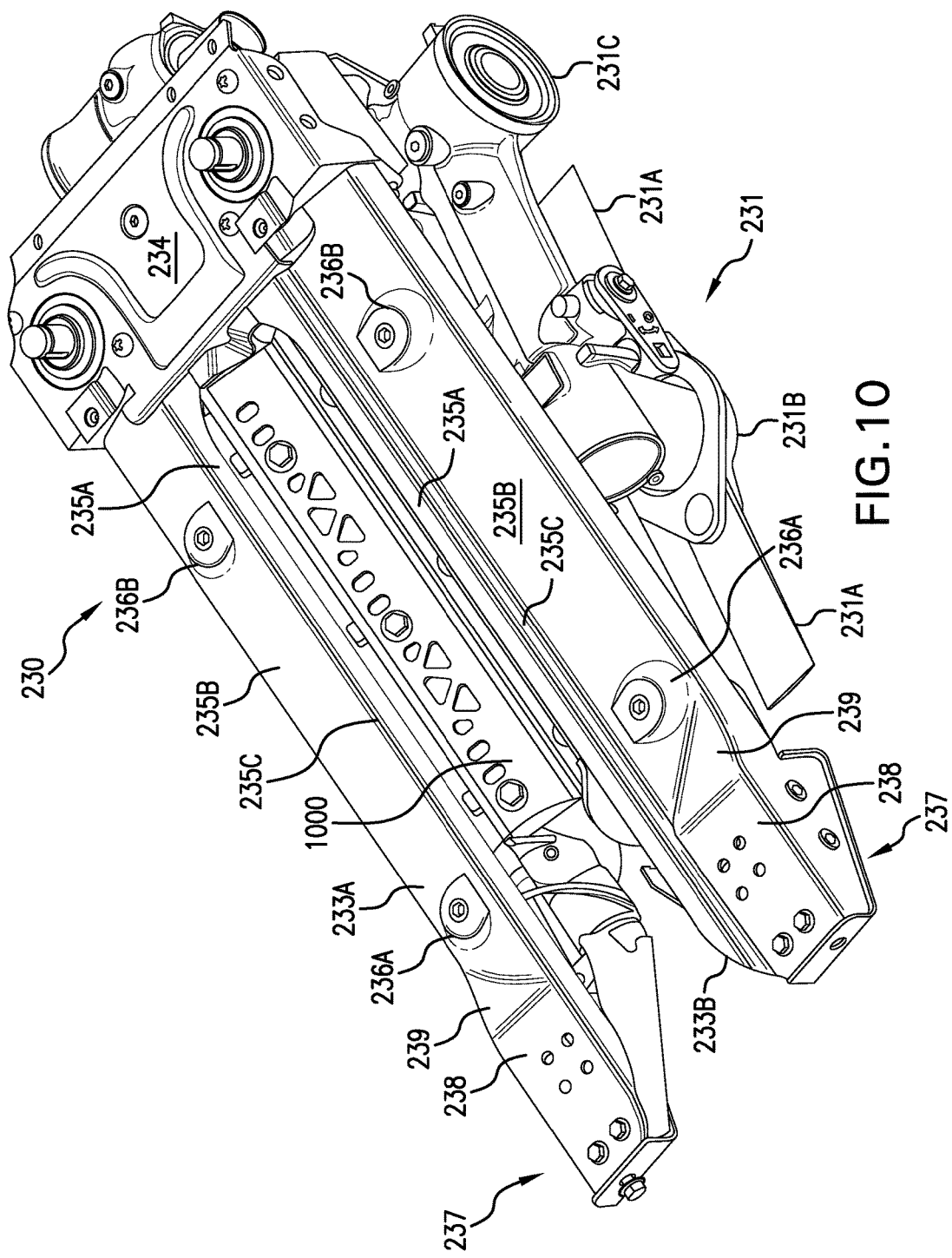
FIG. 10 is a perspective view of the legs of the row unit of FIGS. 3-9 with the deck plates removed.
Figure 11:
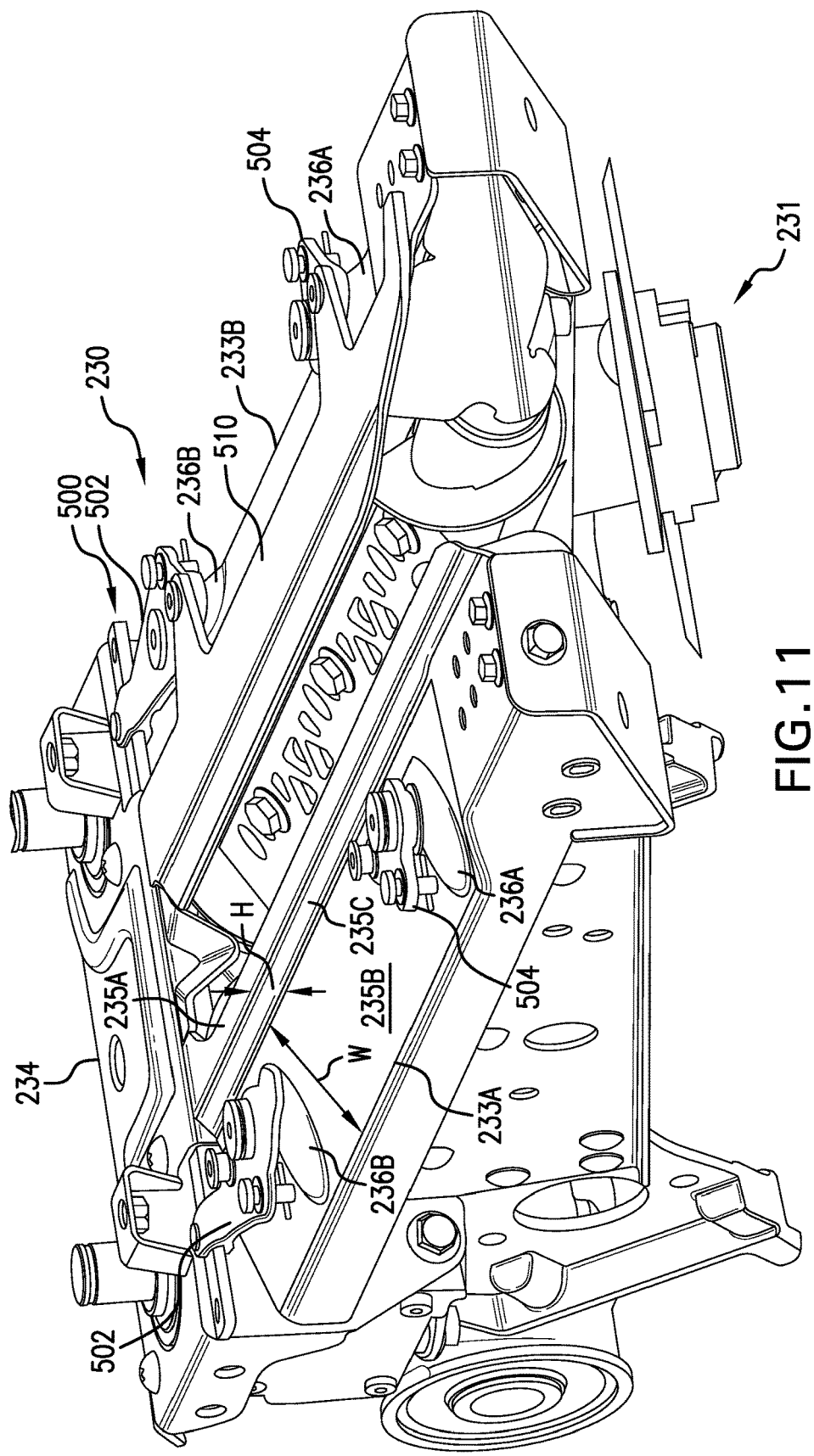
FIG. 11 is another perspective view of the row unit of FIGS. 3-10 to illustrate a contact area of the deck plates and the adjacent sloped surface.

Illustrated in FIG. 10 is a perspective view of the row unit 230, in accordance with an exemplary embodiment of the present invention. The row unit 230 is illustrated in FIG. 10 without the deck plates 510 to more clearly illustrate the sloped surfaces 235B of the legs 233A and 233B, the flat surfaces 238 in the end regions 237 of the legs 233A and 233B, and the sloped surfaces 239 between the flat surfaces 238 and the sloped surfaces 235B of the legs 233A and 233B. Illustrated in FIG. 11 is a perspective view of the row unit 230 from a different vantage compared to that of FIG. 11, in accordance with an exemplary embodiment of the present invention. Unlike FIG. 10, FIG. 11 illustrates the deck plate 510 connected to the pivot links 502 and 504, which are mounted on pedestals 236B and 236A, respectively.

With reference to FIGS. 10 and 11, the nesting of gearbox 231C is seen as being between the legs of adjacent row units 230 beneath the top of those legs. In FIG. 10 knife blades 1000 can easily be seen.

As illustrated in FIGS. 10 and 11, the widths W' of the slopes 235B are seen to be over a broad portion of the widths of legs 233A and 233B. The ratio of W:W' can even be 1:10, as discussed earlier. Such breadths of the sloped surfaces 235B of the legs 233A, 233B facilitate the shedding of residue material deposited on the arms 233A, 233B during crop harvesting operations of the combine 100. Because the widths W' of the sloped surfaces 235B are significantly greater than the widths W of the flat surfaces 235A and because the deck plates 510 rest atop the flat surfaces 235A and effectively "seal" the flat surfaces 235A, the deck plates 510 prevent accumulation of residue material on the flat surfaces 235A. Any material that is deposited on the legs 233A, 233B is deposited on the slopes 235B, which because of their slopes shed such material.

It is also seen in FIGS. 10 and 11 that while sloped surface 235B is generally adjacent to the flat top surface 235A there can be a transition 235C that provides a transition from the flat top surface 235A to the sloped surface 235B. In an exemplary embodiment, the transition 235C may be a sloped surface having a slope that is greater than the sloped surface 235B.

Disposed on the sloped surface 235B of each leg 233A, 233B are pedestals 236A and 236B. The pivot links 504 of each leg 230 are disposed on a respective pedestal 236A and are rotatably mounted thereto. The pivot links 502 of each leg 230 are disposed on a respective pedestal 236B and are rotatably mounted thereto. The deck plate 510 of each leg 233A, 233B slidably rests on the surface 235A and is connected to respective links 502 and 504. The positioning of pivot links 502 and 504 and their interaction with deck plate 510 as deck plate 510 rests on surface 235A serve to define the plane in which deck plate 510 is movable.

The transition surface 235C in each leg 233A, 233B as well as the pedestals 23A and 236B of each leg 233A and 233B serve to separate the deck plates 510 from the sloped surfaces 235B of each leg 233A and 233B. Such separation creates a space between the respective sloped surface 235B and the respective deck plate 510 in each leg 233A and 233B. Such space has a height H closest to the flat top surface 235A, which height increases toward the bottom of the sloped surface 235B. This space provides room for residue material that has been deposited on the sloped surface 235B to slide down and away from the row unit 230. Such sliding is facilitated by vibration present in the row unit 230 during operation.

The pedestals 236A and 236B serve to define a support for the links 502 and 504 which are attached to the deck plates 510, which is sufficient to provide support thereto, while minimizing the area of contact between the deck plates 510 and the legs 233A and 233B, while at the same time providing for the above-mentioned space. The pedestals 236A and 236B help to reduce the build-up of rust, debris accumulation, and where sucrose can build up, all of which lead to the binding of the deck plates of prior art systems, which hinders the adjustment of the prior art construct. Additionally, placement of the pedestals 236A and 236B within the sloped surfaces 235B provides for a greater expanse of the sloped surfaces 235B compared with prior art systems. In an exemplary embodiment, the pedestals 236A and 236B are integrally formed with and within the sloped surfaces 235B.

Surface 235A and transition surface 235C can be thought of as being formed from the otherwise sloped area 235B and that sloped area 235B dominates the construct under the deck plate assembly 500. The domination of sloped area 235B is also seen in that the two areas that support pivot links 502 and 504 are exceptions to the otherwise downward slope of sloped area 235B.

Figure 12:
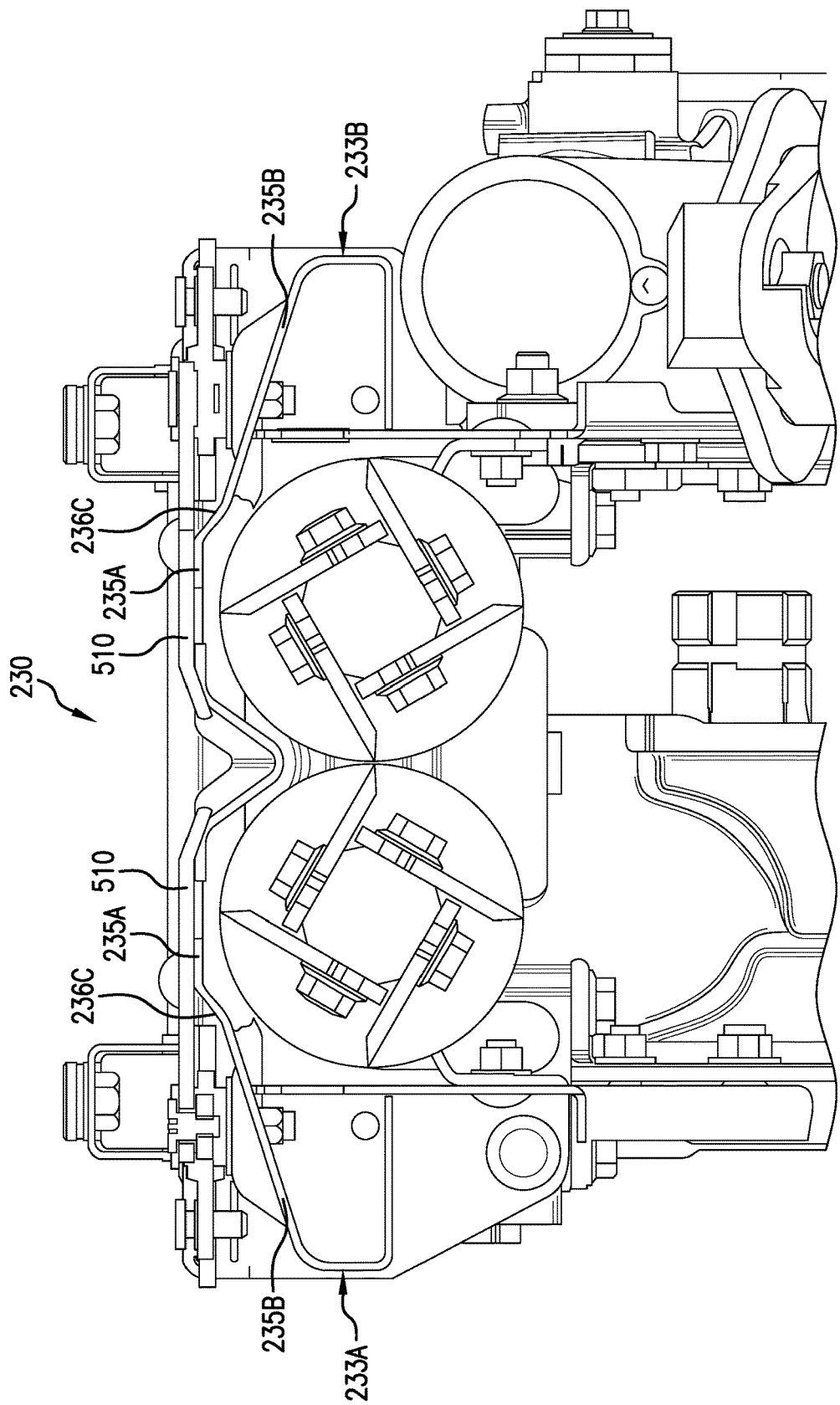
FIG. 12 is a partial sectioned view of the row unit of FIGS. 3-11.

Illustrated in FIG. 12 is a partially sectioned view of row unit 230 taken along a section B-B through the legs 233A and 233B adjacent to the pedestals 236B in FIG. 5, in accordance with an exemplary embodiment of the present invention. The length of slope 235B may be shorter than the length of flat surface 235A as can be observed in FIGS. 10 and 11. Although the length of slope 235B may be shorter, it continues along a significant or substantial part of the length of surface 235A.

Figure 13:
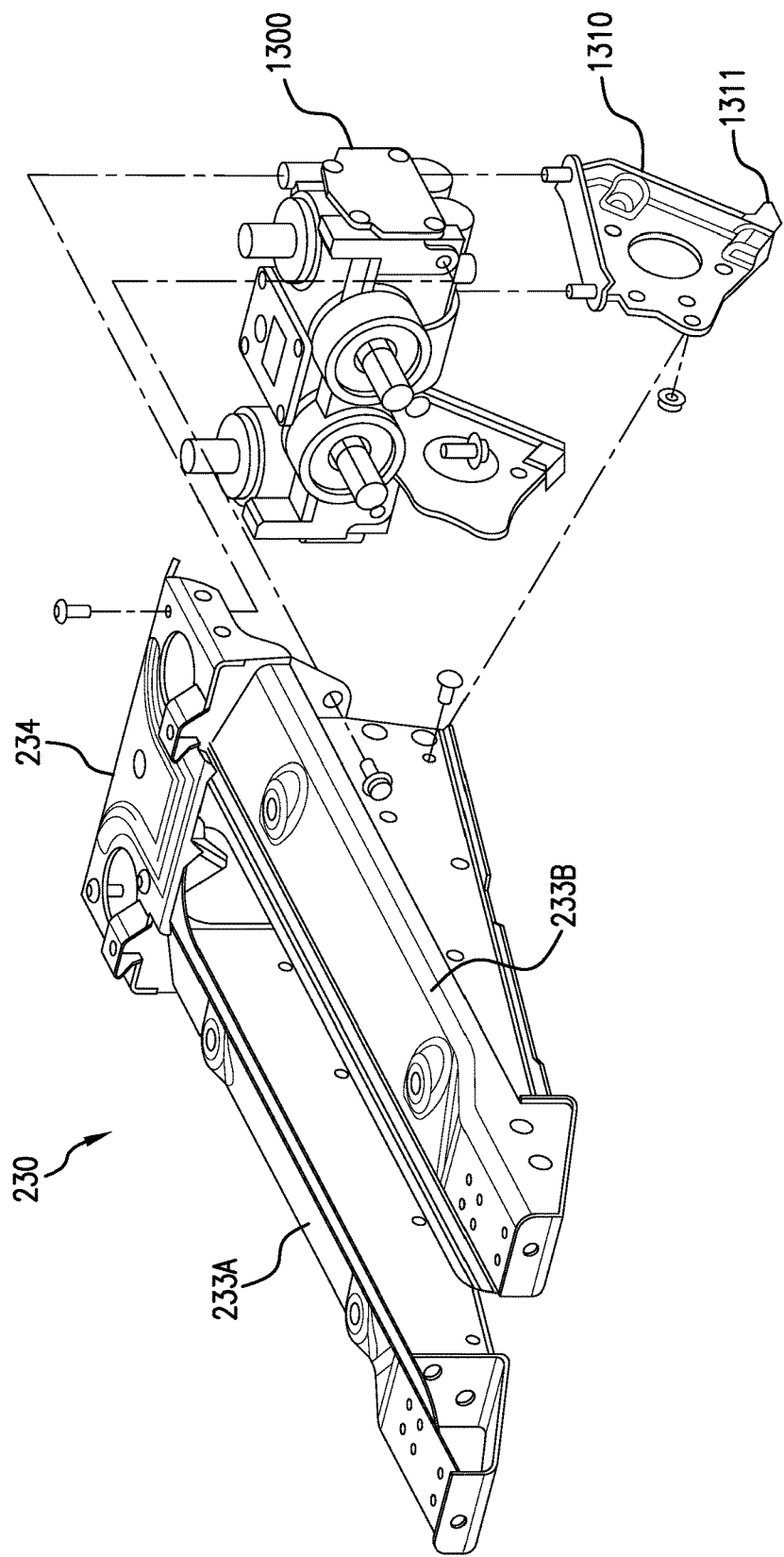
FIG. 13 is a perspective exploded view of a row unit of FIGS. 3-12 illustrating the modular nature of the assembly.

Now additionally referring to FIG. 13 there is shown the modularization of row unit 230 with gearbox 1300 and side plate 1310 shown relative to legs 235A and 235B. Frame 234 has side plates 1310 coupled thereto with protrusions 1311 extending therefrom. Gearbox 1300 provides driving force to the moving components of row unit 230.

Figure 14:
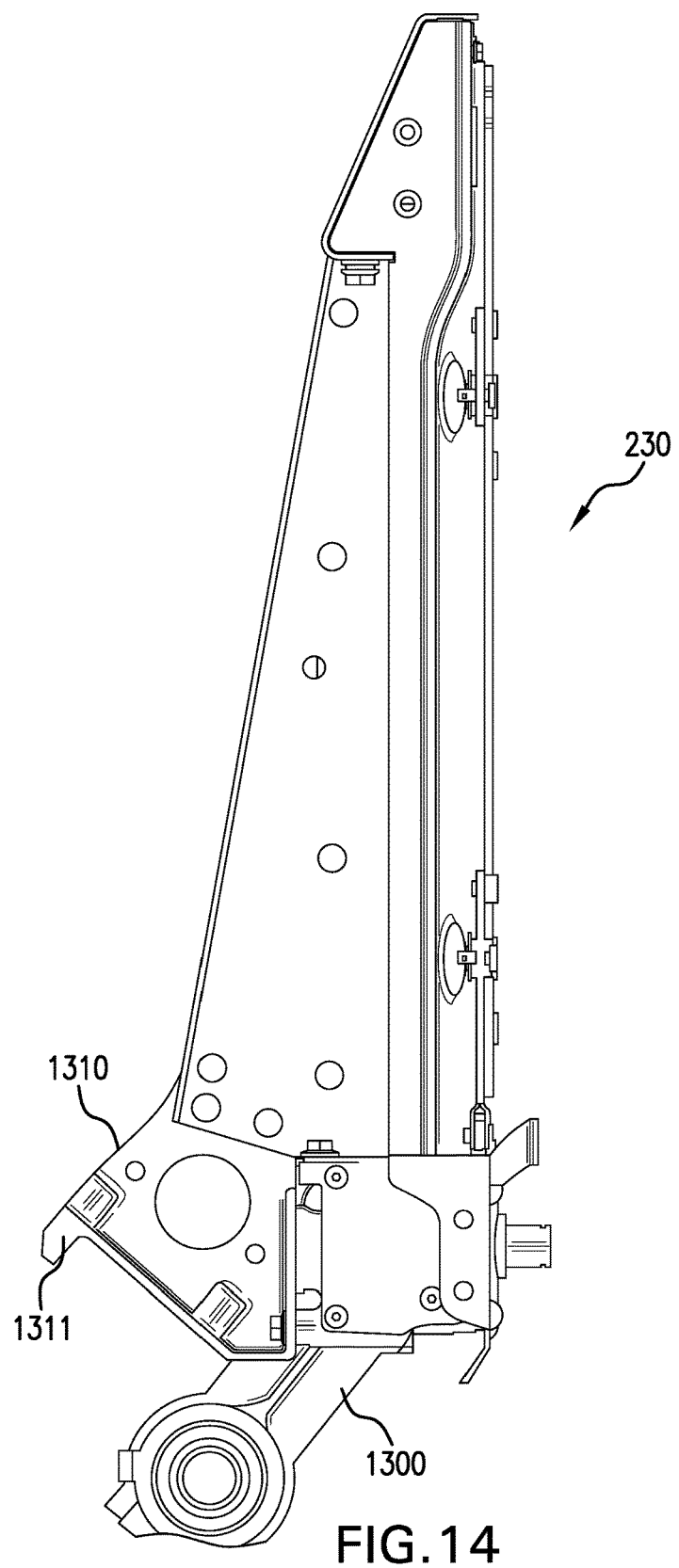
FIG. 14 is view of the frame and leg assembly oriented as it would be installed on a tool bar of the header of FIG. 2.
Figure 15:
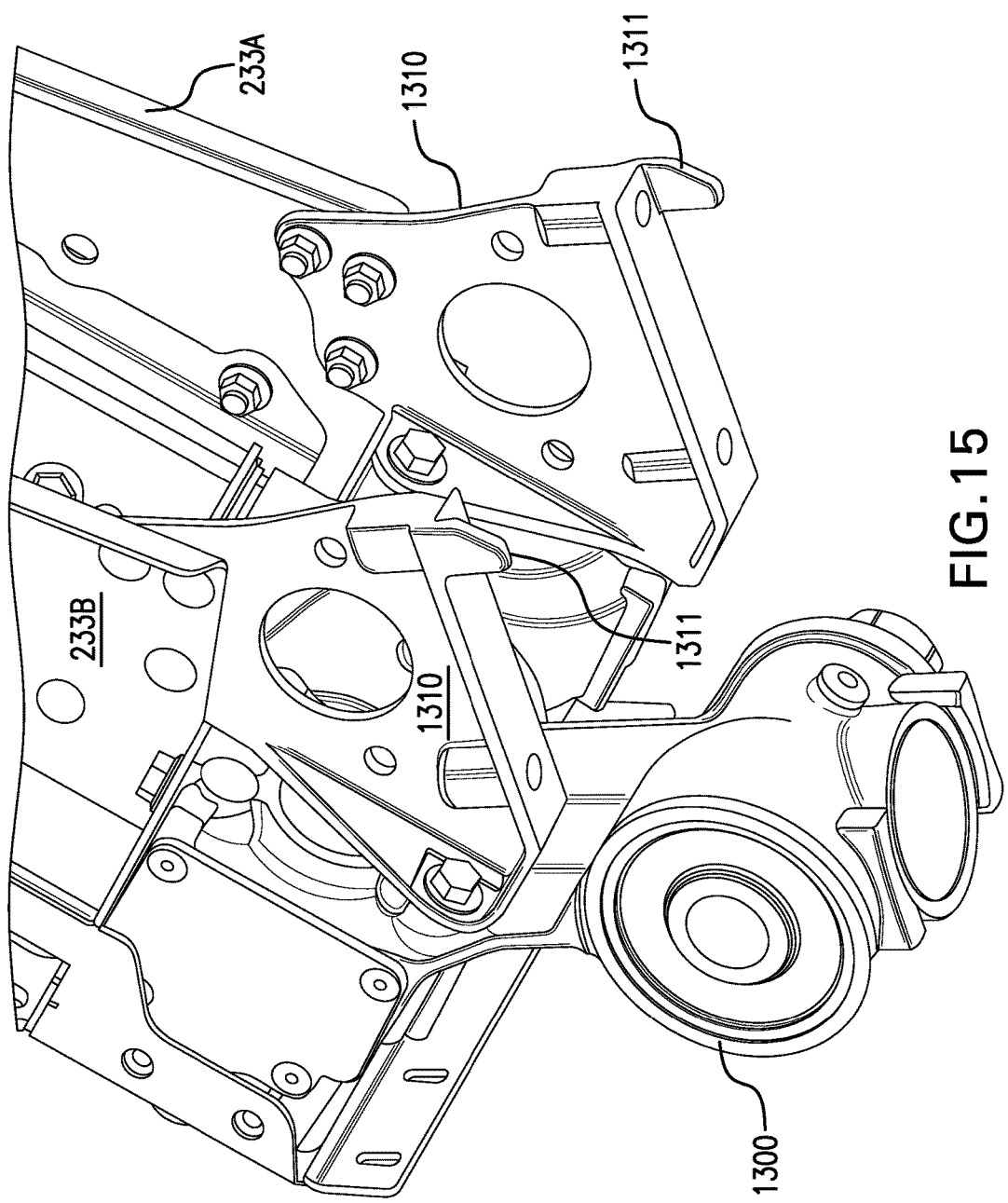
FIG. 15 is another view of the frame and leg assembly of FIG. 14 to illustrate protrusions that assist in the assembly and alignment of the assembly.

Now, additionally referring to FIGS. 14 and 15 there are shown some additional views of row unit 230 oriented in a direction in which side plates 1310 will encounter tool bar 201 as row unit 230 is lowered during assembly. As can be seen, protrusions 1311 extend outwardly and will encounter tool bar 201 allowing row unit 230 to catch onto tool bar 201. It is also contemplated that side plates 1310 will allow for the spacing or indexing of the row units along tool bar 201.

A corn head row unit 230 construction of the exemplary invention is capable of 15" row spacing. While working with this smaller frame package, many additional features have been built in to the system. 1.) The narrow leg construction allows for nesting of chopping gearboxes 231C. 2.) Built in track on the top of the row unit for the deck plate adjustment linkage 501. 3.) Minimal contact between the top of the legs 233A and 233B and the deck plates 510. 4.) Clear access to stalk rolls from the topside of the row unit 230 for serviceability of individual knives 1000. 5.) Sloped top surface 235B of the frame to aid in shedding of material from this narrow spacing. 6.) Modular setup of the main frame to pedestals. 7.) Frame pedestal locating features 1311 for setting to the toolbar 201.

The problem with the prior art is not being able to equip narrow row unit headers with chopping configurations. This new frame construction allows for chopping capability down to 15" row spacing by nesting the chopper 231 as a bolt on option to the frame/legs making it easily serviceable. This also allows for the same base row unit frame between chopping and non-chopping, which is part of what is meant by nesting of the chopper assembly between the legs.

By having the track system for the movement of linkage 501 on the top of the row unit 230 there was a need for protection from wear and material build up. The track systems provide this while also acting as a guide for the linkage 501. Another issue overcome with this exemplary embodiment of the invention, is that the deck plate to frame interaction of the prior art had increased loading that would occur and increase over time from material build up, sucrose and even rust. By minimizing the contact area of surface 235A and deck plate 510 the loading is reduced, thereby protecting the system.

Another issue with prior art row units is serviceability to the stalk rolls. Typically an operator would have to take the whole roll out all together or work on the knives individually from the bottom. With the cutaway on the top frame legs 233A and 233B, the operator can now access these rolls easily from the topside for improved service.

Yet another issue with the prior art row units is the build up of material during operation. By creating a continuous slope 235B on the top side as shown, the exemplary embodiment of the invention shows an improved ability of the row unit to shed material and cut down on potential functional issues such as overloading the system in freezing conditions.

Another issue with the prior art row units is a requirement for the operator to completely take the row units off of the toolbar for service and requires the operator to remove the driveline shaft. With the modular setup of the exemplary embodiment of the invention, the operator has the ability to take away the frame and work on the gearbox while it is still attached to the toolbar. This can cut down on service time by not removing the line shaft as well as work around issues in the field if the proper equipment is not available to remove the whole row unit.

The assembly of prior art row units to the tool bar can be difficult during installation, specifically while trying to align hardware. These new inventive pedestals 1310 have a hook feature 1311 built in to stop the row unit 230 in the correct position for hardware alignment, which improves ease of assembly.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A row unit system for a corn header of an agricultural harvester, the row unit system comprising:
   a plurality of row units comprising a first row unit and an adjacent second row unit, each of the plurality of row units comprising:
      a first leg comprising a first flat portion and a first sloped portion adjacent to the first flat portion;
      a second leg comprising a second flat portion and a second sloped portion adjacent to the second flat portion;
      a first deck plate in sliding contact along the first flat portion of the first leg; and
      a second deck plate in sliding contact along the second flat portion of the second leg; and
   a plurality of chopper assemblies positioned proximate to the legs of the plurality of row units, the plurality of chopper assemblies comprising a first chopper assembly nested between the second leg of the first row unit and the first leg of the second row unit.

2. The row unit system of claim 1, wherein each of the plurality of row units further comprises a throat, and wherein the throat of the first row unit and the throat of the second row unit are 20 or fewer inches apart.

3. The row unit system of claim 2, wherein the throat of the first row unit and the throat of the second row unit are approximately 15 inches apart.

4. The row unit system of claim 1, wherein each of the plurality of chopper assemblies comprises a gearbox, wherein portions of the second leg of the first row unit and the first leg of the second row unit are above the gearbox of the first chopper assembly, and wherein the gearbox of the first chopper assembly is horizontally situated between the second leg of the first row unit and the first leg of the second row unit.

5. The row unit system of claim 1,
   wherein the sloped portions of the first and second legs of each of the plurality of row units are along most of the flat portions upon which the first and second deck plates of the each of the plurality of row units slide.

6. The row unit system of claim 5, wherein the sloped portions are wider than the flat portions.

7. The row unit system of claim 6, wherein widths of the sloped portions are multiple times wider than widths of the flat portions.

8. The row unit system of claim 5, wherein, for each of the plurality of row units, the sloped portions are angled downwardly relative to the flat portions away from the first and second deck plates by at least 18 degrees.

9. The row unit system of claim 8, wherein, for each of the plurality of row units, the sloped portions are angled downwardly relative to the flat portions away from the first and second deck plates by approximately 20 degrees.

10. The row unit system of claim 5, wherein, for each of the plurality of row units, each of the flat portions has a width that is less than half of a width of the deck plates.

11. The row unit system of claim 10, wherein, for each of the plurality of row units, the width of each of the flat portions is less than a fourth of the width of the deck plates.

12. The row unit system of claim 1,
   wherein, for each of the plurality of row units:
      the first leg further comprises at least one first pedestal disposed on the first sloped portion, and
      the second leg further comprises at least one second pedestal disposed on the second sloped portion, and
   wherein each of the plurality of row units further comprises a first deck plate pivot link disposed on the at least one first pedestal and a second deck plate pivot link disposed on the at least one second pedestal.

13. The row unit system of claim 12, wherein, for each of the plurality of row units:
   the first deck plate is coupled to the first deck plate pivot link, and
   the second deck plate is coupled to the second deck plate pivot link.

14. An agricultural vehicle, comprising:
   a chassis;
   a crop processing mechanism carried by the chassis and configured to separate crop material and discharge crop residue therefrom; and
   a header system that gathers crop, the header system being coupled to the chassis, the header system including:
      a tool bar;
      a plurality of row units coupled to the tool bar, the plurality of row units comprising a first row unit and an adjacent second row unit, each of the plurality of row units comprising:
         a first leg comprising a first flat portion and a first sloped portion adjacent to the first flat portion;
         a second leg comprising a second flat portion and a second sloped portion adjacent to the second flat portion;
         a first deck plate in sliding contact along the first flat portion of the first leg; and
         a second deck plate in sliding contact along the second flat portion of the second leg; and
      a plurality of chopper assemblies positioned proximate to the legs of the plurality of row units, the plurality of chopper assemblies comprising a first chopper assembly nested between the second leg of the first row unit and the first leg of the second row unit.

15. The agricultural vehicle of claim 14, wherein each of the plurality of row units further comprises a throat, and wherein the throat of the first row unit and the throat of the second row unit are 20 or fewer inches apart.

16. The agricultural vehicle of claim 14,
   wherein the sloped portions of the first and second legs of each of the plurality of row units are along most of the flat portions upon which the first and second deck plates of the each of the plurality of row units slide.

17. The agricultural vehicle of claim 16, wherein the sloped portions are wider than the flat portions.

18. The agricultural vehicle of claim 17, wherein widths of the sloped portions are multiple times wider than widths of the flat portions.

19. The agricultural vehicle of claim 16, wherein, for each of the plurality of row units, the sloped portions are angled downwardly relative to the flat portions away from the first and second deck plates by at least 18 degrees.

20. The agricultural vehicle of claim 19, wherein, for each of the plurality of row units, the sloped portions are angled downwardly relative to the flat portions away from the first and second deck plates by approximately 20 degrees.

21. The agricultural vehicle of claim 15, wherein the throat of the first row unit and the throat of the second row unit are approximately 15 inches apart.

22. The agricultural vehicle of claim 14, wherein each of the plurality of chopper assemblies comprises a gearbox, wherein portions of the second leg of the first row unit and the first leg of the second row unit are above the gearbox of the first chopper assembly, and wherein the gearbox of the first chopper assembly is horizontally situated between the second leg of the first row unit and the first leg of the second row unit.

23. The agricultural vehicle of claim 14,
wherein, for each of the plurality of row units:
the first leg further comprises at least one first pedestal disposed on the first sloped portion, and
the second leg further comprises at least one second pedestal disposed on the second sloped portion, and
wherein each of the plurality of row units further comprises a first deck plate pivot link disposed on the at least one first pedestal and a second deck plate pivot link disposed on the at least one second pedestal.

24. The agricultural vehicle of claim 23, wherein, for each of the plurality of row units:
the first deck plate is coupled to the first deck plate pivot link, and
the second deck plate is coupled to the second deck plate pivot link.

* * * * *